US012630234B2

(12) United States Patent
    Rutman et al.

(10) Patent No.: US 12,630,234 B2
(45) Date of Patent: May 19, 2026

(54) MODULAR ACCESSORY BASE PLATE

(71) Applicant: Ford Global Technologies, LLC, Dearborn, MI (US)

(72) Inventors: Matthew B. Rutman, Westland, MI (US); Eric Scott Levine, Novi, MI (US); Stuart C. Salter, White Lake, MI (US); Daniel Ritz, Windsor (CA); Todd Rakus, Windsor (CA)

(73) Assignee: Ford Global Technologies, LLC, Dearborn, MI (US)

( * ) Notice: Subject to any disclaimer, the term of this patent is extended or adjusted under 35 U.S.C. 154(b) by 619 days.

(21) Appl. No.: 18/104,494

(22) Filed: Feb. 1, 2023

(65) Prior Publication Data

US 2024/0253711 A1 Aug. 1, 2024

(51) Int. Cl.
| | |
|---|---|
| *B62D 33/023* | (2006.01) |
| *B60R 13/01* | (2006.01) |
| *B62D 25/20* | (2006.01) |
| *B62D 33/04* | (2006.01) |

(52) U.S. Cl.
CPC ............ *B62D 33/023* (2013.01); *B60R 13/01* (2013.01); *B62D 25/2054* (2013.01); *B62D 33/04* (2013.01)

(58) Field of Classification Search
None
See application file for complete search history.

(56) References Cited

U.S. PATENT DOCUMENTS

| | | | | |
|---|---|---|---|---|
| 2,384,965 A * | 9/1945 | Reid | B62D 33/04 | |
| | | | 52/510 | |
| 3,815,500 A * | 6/1974 | Glassmeyer | B61D 45/001 | |
| | | | 296/181.3 | |
| 3,877,671 A * | 4/1975 | Underwood | B61D 45/002 | |
| | | | 410/97 | |
| 4,020,770 A * | 5/1977 | McLennan | B64D 9/003 | |
| | | | 410/105 | |
| 5,509,715 A * | 4/1996 | Scharpf | B62D 25/2054 | |
| | | | 105/422 | |
| 5,823,724 A * | 10/1998 | Lee | B60P 7/0815 | |
| | | | 410/112 | |
| 6,669,271 B2 * | 12/2003 | Booher | B62D 33/023 | |
| | | | 296/186.1 | |
| 6,973,881 B2 * | 12/2005 | Bianchi | E04F 15/06 | |
| | | | 105/422 | |

(Continued)

FOREIGN PATENT DOCUMENTS

| | | | |
|---|---|---|---|
| CN | 2863972 | * | 1/2007 |
| DE | 10057577 A1 | | 10/2001 |

(Continued)

OTHER PUBLICATIONS

US 10,947,009 B2, 03/2021, Brunner et al. (withdrawn)

*Primary Examiner* — Joseph D. Pape
(74) *Attorney, Agent, or Firm* — Vichit Chea; Carlson, Gaskey & Olds, P.C.

(57) ABSTRACT

A base plate system includes a plurality of base plate panels that are attached to each other to provide a base plate that includes a surface to hold an accessory fixed relative to the base plate. An attachment feature is associated with each base plate panel such that adjacent base plate panels can be attached to each other to provide a desired base plate size.

21 Claims, 11 Drawing Sheets

(56)                  References Cited

U.S. PATENT DOCUMENTS

| | | | | |
|---|---|---|---|---|
| 8,011,692 B2 * | 9/2011 | Friesen | ................... | B60R 11/06 |
| | | | | 280/759 |
| 8,857,125 B2 * | 10/2014 | Lu | ......................... | B27M 3/002 |
| | | | | 52/581 |
| 9,272,740 B1 * | 3/2016 | Portenier | ............... | B62D 33/02 |
| 10,000,161 B2 | 6/2018 | Hemphill et al. | | |
| 10,207,650 B1 | 2/2019 | Banegas | | |
| 10,583,962 B2 | 3/2020 | Brunner et al. | | |
| 10,619,661 B2 | 4/2020 | Hagedorn et al. | | |
| 10,703,534 B2 | 7/2020 | Brunner et al. | | |
| D895,966 S | 9/2020 | Brunner et al. | | |
| D895,967 S | 9/2020 | Brunner et al. | | |
| D896,517 S | 9/2020 | Brunner et al. | | |
| D896,518 S | 9/2020 | Brunner et al. | | |
| D897,103 S | 9/2020 | Brunner et al. | | |
| 10,780,836 B1 * | 9/2020 | Fisher | ....................... | B60R 9/02 |
| D898,320 S | 10/2020 | Brunner et al. | | |
| 10,962,218 B2 | 3/2021 | Plato et al. | | |
| 10,981,696 B2 | 4/2021 | Brunner et al. | | |
| D917,977 S | 5/2021 | Brunner et al. | | |
| D918,584 S | 5/2021 | Brunner et al. | | |
| D919,296 S | 5/2021 | Brunner et al. | | |
| 11,008,136 B2 | 5/2021 | Brunner et al. | | |
| D920,671 S | 6/2021 | Brunner et al. | | |
| 11,027,883 B1 | 6/2021 | Brunner et al. | | |
| D923,935 S | 7/2021 | Brunner et al. | | |
| 11,192,690 B1 | 12/2021 | Brunner et al. | | |
| 11,230,326 B2 * | 1/2022 | Elder | ................. | B62D 33/0222 |
| 11,268,691 B2 | 3/2022 | Plato et al. | | |
| 11,365,026 B2 | 6/2022 | Brunner et al. | | |
| 11,427,382 B2 | 8/2022 | Brunner et al. | | |
| 11,465,805 B2 | 10/2022 | Brunner et al. | | |
| 2002/0008184 A1 | 1/2002 | Kania | | |
| 2008/0179363 A1 | 7/2008 | Schmidkofer | | |
| 2009/0026784 A1 | 1/2009 | Green | | |
| 2009/0212584 A1 * | 8/2009 | Hill | ........................... | B60R 7/02 |
| | | | | 296/37.5 |
| 2014/0191527 A1 | 7/2014 | Riley | | |
| 2019/0106063 A1 * | 4/2019 | Briggs | .................... | B60R 13/01 |
| 2023/0227114 A1 * | 7/2023 | Dylewski, II | .......... | B62D 33/02 |
| | | | | 296/26.09 |
| 2023/0303898 A1 * | 9/2023 | Ostlund | ..................... | C09J 7/30 |

FOREIGN PATENT DOCUMENTS

| | | | | | |
|---|---|---|---|---|---|
| EP | | 3106371 A1 * | 12/2016 | ........... | B60R 13/011 |
| ES | | 2200561 * | 1/2007 | | |
| WO | | 2020264472 A1 | 12/2020 | | |

* cited by examiner

MODULAR ACCESSORY BASE PLATE

TECHNICAL FIELD

This disclosure relates generally to a base plate that secures accessories within a cargo or work area and, more particularly, to a base plate system that comprises modular wall plates and/or modular bed plates that are attached to each other to provide a desired overall plate size.

BACKGROUND

Vehicles transport various types of cargo. A user can, for example, rely on a vehicle to transport accessories, such as containers and tools, to and from a jobsite. The accessories that need to be transported can vary based on the tasks the user performs at the jobsite. Support surfaces in cargo or work areas may be configured to securely support the accessories.

SUMMARY

In some aspects, the techniques described herein relate to a base plate system, including: a plurality of base plate panels that are attached to each other to provide a base plate that includes a surface to hold an accessory fixed relative to the base plate; and an attachment feature associated with each base plate panel such that adjacent base plate panels can be attached to each other to provide a desired base plate size.

In some aspects, the techniques described herein relate to a base plate system, wherein at least some of the plurality of base plate panels include a plurality of mounting foot apertures configured to receive a mounting foot associated with the accessory.

In some aspects, the techniques described herein relate to a base plate system, wherein the attachment feature comprises a plurality of spot welds.

In some aspects, the techniques described herein relate to a base plate system, wherein the attachment feature comprises a plurality of fasteners.

In some aspects, the techniques described herein relate to a base plate system, wherein the plurality of base plate panels comprise at least a starter panel, an end panel, and at least one center panel having a first side attached to the starter panel and a second side, opposite to the first side, attached to the end panel.

In some aspects, the techniques described herein relate to a base plate system, wherein the at least one center panel comprises a plurality of center panels.

In some aspects, the techniques described herein relate to a base plate system, wherein both of the starter panel and end panel have a first side forming a generally straight edge portion of the base plate, and wherein the first sides of the plurality of center panels comprise a first contoured profile and the second sides of the plurality of center panels comprise a second contoured profile that fits with the first contoured profile to attach the center panels to each other.

In some aspects, the techniques described herein relate to a base plate system including a plurality of vertical bars and a plurality of horizontal rails that form a support structure, wherein the base plate is mounted to the support structure.

In some aspects, the techniques described herein relate to a base plate system, wherein the attachment feature comprises at least one fastener, and wherein one of the center panel, end panel, and starter panel overlaps another of the center panel, end panel, and starter panel to form an overlap area, and wherein the at least one fastener extends through the overlap area to connect the base plate to one of the plurality of horizontal rails.

In some aspects, the techniques described herein relate to a base plate system including a spacer for each fastener used to attach the end panel and starter panel to one of the plurality of horizontal rails or plurality of vertical bars.

In some aspects, the techniques described herein relate to a base plate system, wherein ends of the horizontal rails float within slots formed in the vertical bars.

In some aspects, the techniques described herein relate to a base plate system, wherein the vertical bars include a support foot at one end and wherein an opposite end of the vertical bars are received within a slot formed in a top plate that is configured to be mounted to a vehicle side wall structure.

In some aspects, the techniques described herein relate to a base plate system, wherein the base plate is mounted within a vehicle cargo area to provide a floor mounted base plate that is movable relative to a fixed structure between a retracted position and an extended position.

In some aspects, the techniques described herein relate to a base plate system, including: a plurality of base plate panels comprising at least a starter panel, an end panel, and at least one center panel having a first side attached to the starter panel and a second side, opposite to the first side, attached to the end panel to form a base plate; a plurality of mounting foot apertures formed in the base plate that are configured to receive an accessory mounting foot to hold an accessory fixed relative to the base plate; and an attachment feature associated with each base plate panel of the plurality of base plate panels such that adjacent base plate panels can be attached to each other to provide a desired base plate size.

In some aspects, the techniques described herein relate to a base plate system including a plurality of vertical bars and a plurality of horizontal rails, wherein the vertical bars include a support foot at one end and wherein an opposite end of the vertical bars are received within a slot formed in a top plate that is configured to be mounted to a vehicle side wall structure, and wherein ends of the horizontal rails float within slots formed in the vertical bars to form a support structure, and wherein the base plate is mounted to the support structure.

In some aspects, the techniques described herein relate to a base plate system, wherein the base plate is mounted within a vehicle cargo area to provide a floor mounted base plate that is movable relative to a fixed structure between a retracted position and an extended position.

In some aspects, the techniques described herein relate to a method, the method including: providing a plurality of base plate panels that each include a surface with a plurality of mounting foot apertures configured to receive a mounting foot from an accessory; and attaching a selected number of base plate panels to each other to provide a base plate having a desired base plate size.

In some aspects, the techniques described herein relate to a method, wherein the plurality of base plate panels comprise at least a starter panel, an end panel, and at least one center panel, and including attaching a first side of the center panel to the starter panel and attaching a second side of the center panel, opposite to the first side, to the end panel to form the base plate.

In some aspects, the techniques described herein relate to a method including coupling a plurality of vertical bars to a plurality of horizontal rails to form a support structure, and attaching the base plate to the support structure to form a wall mounted base plate system.

In some aspects, the techniques described herein relate to a method including spot welding the starter panel, the end panel, and the at least one center panel together to form the base plate and installing the base plate within a vehicle cargo area to form a floor mounted base plate.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure details a base plate system made from a modular construction where the base plate is used with an accessory attachment system for a vehicle or stationary application. The base plate provides an attachment interface for securing the accessories in place within a cargo or work area. Various types of accessories can be secured to the vehicle through the attachment interface provided by the base plate. The number and positions of base plates can be adjusted for particular vehicles or particular needs. This provides a user with a substantially modular and adjustable mounting and attachment system.

Figure 1A:
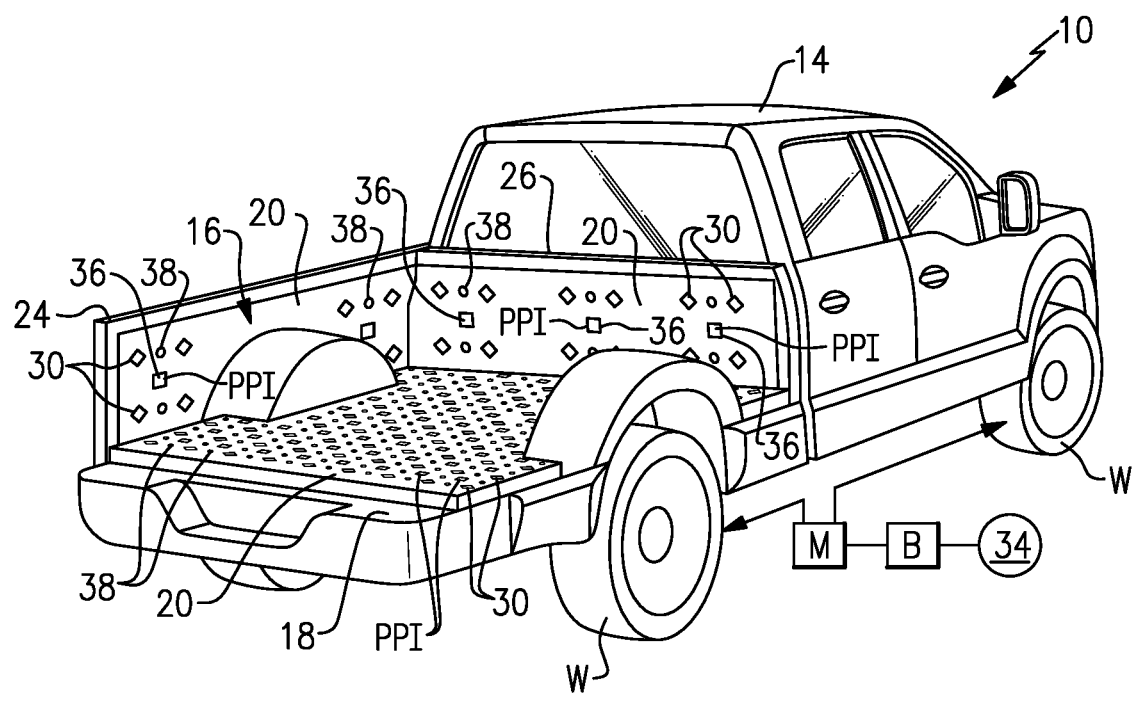
FIG. 1A illustrates a perspective view of a vehicle having a cargo bed equipped with base plates that can be used to secure an accessory according to an exemplary aspect of the present disclosure.
Figure 1B:
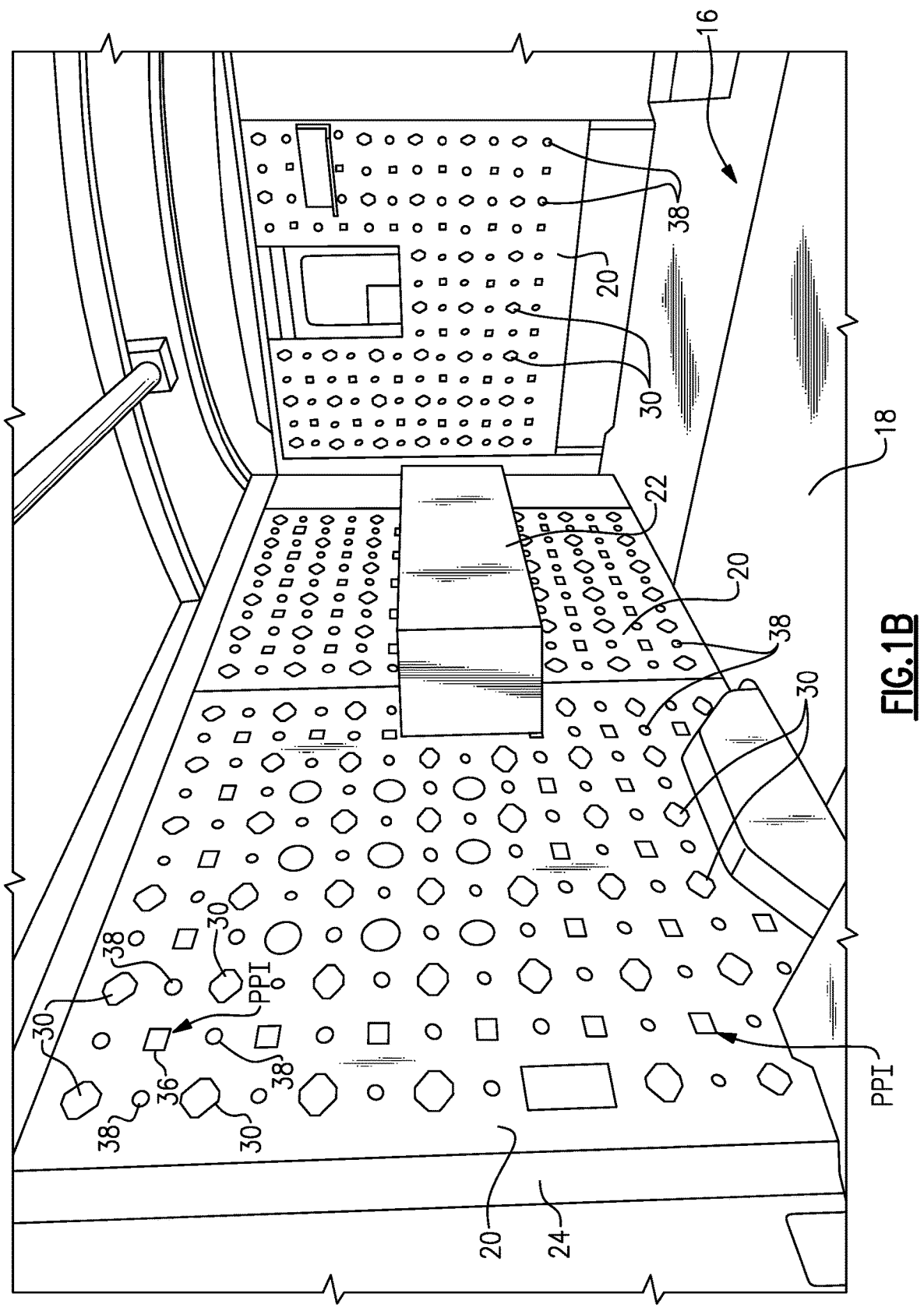
FIG. 1B illustrates a perspective view of a van having a cargo area equipped with base plates that can be used to secure accessories according to an exemplary aspect of the present disclosure.

With reference to FIG. 1A, a vehicle 10 includes a passenger compartment 14 and a cargo bed 16 that is aft of the passenger compartment 14. The cargo bed 16 has a floor 18. In this example, the vehicle 10 is a pickup truck. However, the vehicle 10 could be another type of vehicle in another example, such as a car, van, sport utility vehicle, etc. FIG. 1B shows an example of a van that incorporates a base plate 20 with an accessory attachment and locking system.

The example vehicle 10 is an electrified vehicle and, in particular, a battery electric vehicle (BEV). In another example, the vehicle 10 could be another type of electrified vehicle, such as a plug-in hybrid electric vehicle (PHEV), or a conventional internal combustion engine vehicle.

In particular, the example vehicle 10 includes an electrified powertrain capable of applying a torque from an electric machine M (e.g., an electric motor) to drive a pair of wheels W. The vehicle 10 can include a traction battery pack B, which powers the electric machine M and, potentially, other electrical loads of the vehicle 10.

Figure 1C:
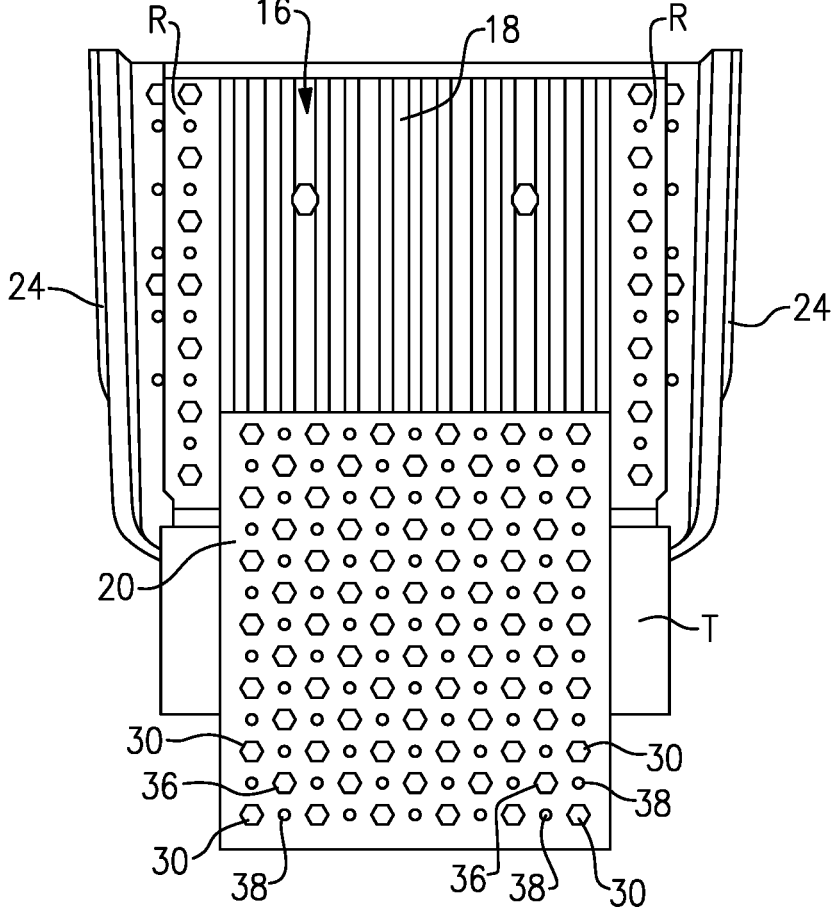
FIG. 1C illustrates a top view of a vehicle where the base plate can be slid out of the cargo area to make the base plate more accessible.

In the exemplary embodiment, one or more base plates 20 are used to support one or more accessories and/or modules 22. In one example, the cargo bed 16 is defined by a pair of side walls 24 (only one is shown in FIG. 1A for purposes of clarity), a rear wall 26, and a tailgate T (FIG. 1C). In one example, the base plates 20 are secured directly to walls 24, 26 and/or to the floor 18 of the cargo bed 16 at a first connection interface. In another example shown in FIG. 1C, the base plates 20 can be supported for sliding movement within the cargo bed 16 on rails R or other types of sliding structures. The accessories and/or modules 22 can be secured to the vehicle 10 by engaging one or more of the base plates 20 via a second connection interface between the accessory 22 and the base plate 20. The accessories/modules 22 can comprise a lockable storage box that holds tools, a container, a refrigerator, etc. For example, the accessory 22 could be a lockable container having a lid L (FIG. 2) that encloses a compartment for storing power tools or other items that require power or data connection.

Figure 2:
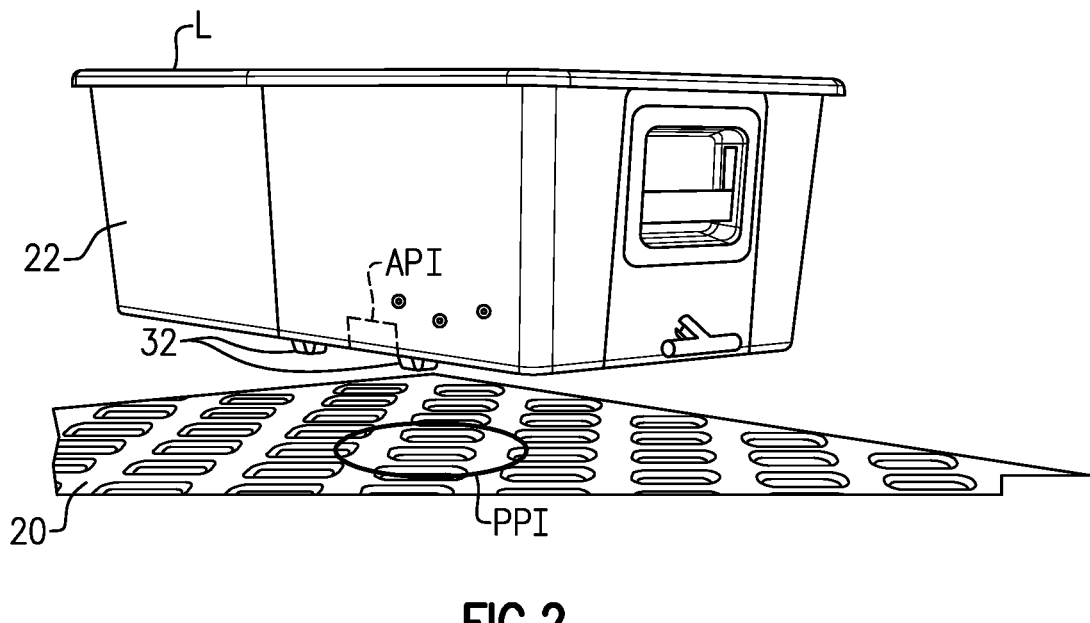
FIG. 2 illustrates a perspective view of an accessory with bottom mounting feet to connect to a base plate.

As shown in FIG. 1A, the base plate 20 includes a plurality of openings or apertures 30. As shown in FIG. 2, an example accessory 22 comprises a lockable container or box 22 that includes one or more mounting feet 32. The box 22 can engage the base plate 20 using an attachment system comprising the plurality of apertures 30 and the mounting feet 32 that cooperate to provide a mechanical connection interface. In this example, the base plates 20 provide the apertures 30 and the accessories 22 include the feet 32. This could be rearranged, however, such that one or all of the feet 32 extend from the base plates 20 and the accessories 22 provide some or all of the apertures 30. The apertures 30 are spaced upwardly from the floor 18 or side wall 24, 26 by an open gap such that the feet 32 from the accessory 22 can be easily inserted into the base plate 20 to attach the accessory 22 to the base plate 20. The accessory 22 can then be removed and replaced with a different accessory 22 as needed. The user can, for example, hold tools for a certain type of job within the accessory 22. When the user needs to work on a different second type of job, the user can swap the accessory 22 for another accessory 22 having specialized tools for the second type of job.

As discussed above, in this example, the accessory 22 comprises a lockable box that is mechanically coupled to the vehicle 10 via the base plate 20. The accessory 22 could additionally include a power connection interface 34 that would be able to supply power to the box itself as well as any tools/devices within the box that would require charging. The power connection interface 34 is powered from the vehicle power supply, such as the battery pack B, for example. Any devices within the lockable box, e.g. rechargeable tools, could be recharged when set within the box and coupled to a charging interface associated with the power connection interface 34 between the accessory 22 and the base plate 20.

In one example, the base plate 20 can also be plugged into either 12V vehicle power or other power sources via a variety of connections/outlets. These power sources supply power to charge or power the accessories 22 via the power supply connection interface 34 associated with the base plate 20. Each accessory 22 has an accessory power interface (API) as shown in FIG. 2. At least some, or all, of the mounting locations for an accessory 22 have a charging interface with a plate power interface (PPI) as shown in FIGS. 1A-1B. The API and the PPI can be a direct electrical connection or can be via an inductive wireless charging connection. The PPI receives vehicle power via the vehicle power supply or other power source.

The base plate 20 can comprise a side mounted attachment interface between the accessory box 22 and the base plate 20, or can comprise a bottom mounted attachment interface as shown in FIG. 2. In the side mounted example, the feet 32 are on the side of the accessory 22 and the base plate 20 is configured to be positioned within the vehicle cargo bed 16 at the side wall 24 that extends upwardly from the floor surface of the truck bed in a vertical direction as shown in FIG. 1A, or at the side wall 24 in the van of FIG. 1B. In the bottom mounted example, the bottom of the accessory 22 includes the feet 32 which fit into apertures 30 formed in the base plate 20 that is located on the floor 18 of the truck or van.

The apertures 30 are formed within the base plate 20 and comprise a plate attachment interface. The base plate 20 also includes an opening or aperture 36 for the PPI and an opening or aperture 38 for a locking feature that allows the accessory 22 to be securely locked to the base plate 20. These apertures 30, 36, 38 are provided at multiple locations on the base plate 20, and are formed in a desired pattern on the base plate 20 to allow for the accessories 22 to be mounted in various different locations and orientations as needed. When the accessory box 22 is attached to the base plate 20, the feet 32 are inserted into the corresponding apertures 30 to mechanically attach the accessory 22 to the base plate 20 in one of the plurality of mounting orientations. The accessory 22 can then be selectively detached from one mounting orientation on the base plate 20 such that the accessory 22 can immediately be reattached in a different one of the mounting orientations.

In one example, the box 22 is held in place by a mechanical locking system that is configured have a locked position where the accessory box 22 is prevented from being removed from the base plate 20 and an unlocked position where the accessory box 22 is allowed to be removed from the base plate 20. An example of such a locking system is found in application Ser. No. 17/993,345 filed on Nov. 23, 2022, which is assigned to the assignee of the subject application, and which is herein incorporated by reference. In one example, the locking mechanism comprises a button that is resiliently biased to extend into the locking aperture 38 on the base plate 20 when the mounting feet 32 are fitted into the corresponding apertures 30 to provide the locked position.

The subject disclosure is directed to a modular wall base plate system (FIG. 3-8) or a modular bed base plate system (FIG. 9) for a vehicle. The modular wall base plate system is mounted to a side wall 24 of a cargo area and the modular bed base plate system is mounted to a floor surface 18 of the cargo area. In one example, the modular wall base plate system and the modular bed base plate system are comprised of a plurality of base plate panels 40 that are attached to each other. The number of base plate panels 40 is varied to provide the desired size wall base plate 20a (FIG. 3) or bed base plate 20b (FIG. 9). In one example, an attachment feature is associated with each base plate panel 40 such that adjacent base plate panels 40 can be attached to each other to provide the desired base plate size. In the wall base plate 20a, the panels 40 are attached to a mounting grid 42 (FIG. 3) comprised of a plurality of horizontal rails 44 and a plurality of vertical bars 46. In the bed base plate 20b, the plurality of panels 40 are spot welded together to increase strength and rigidity, and the bed base plate 20b is able to be slid out of the cargo bed area as a unit (FIG. 1C) for better access.

Figure 3:
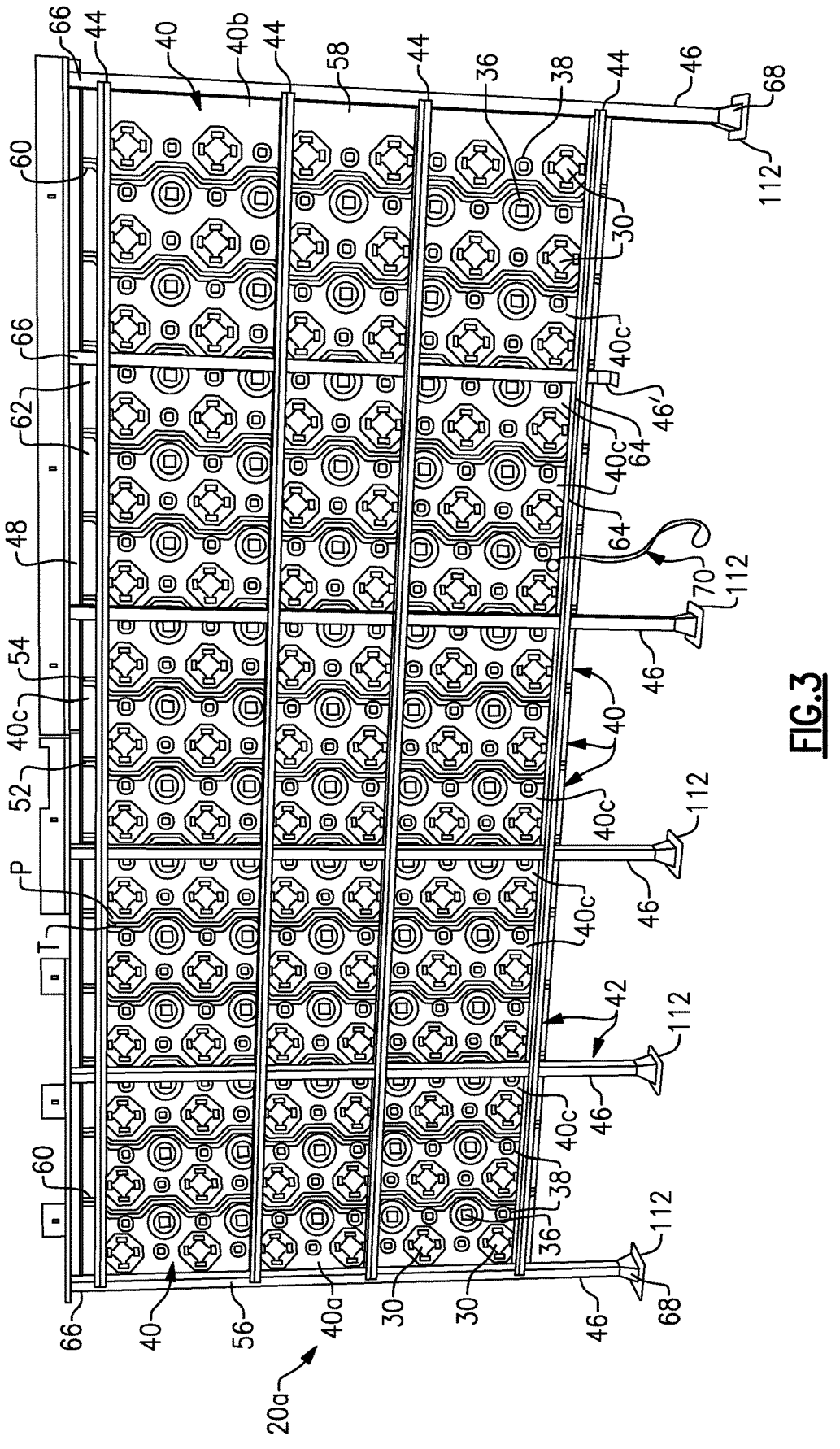
FIG. 3 is a perspective rear view of one example of a modular base plate system for a wall mount configuration.
Figure 4:
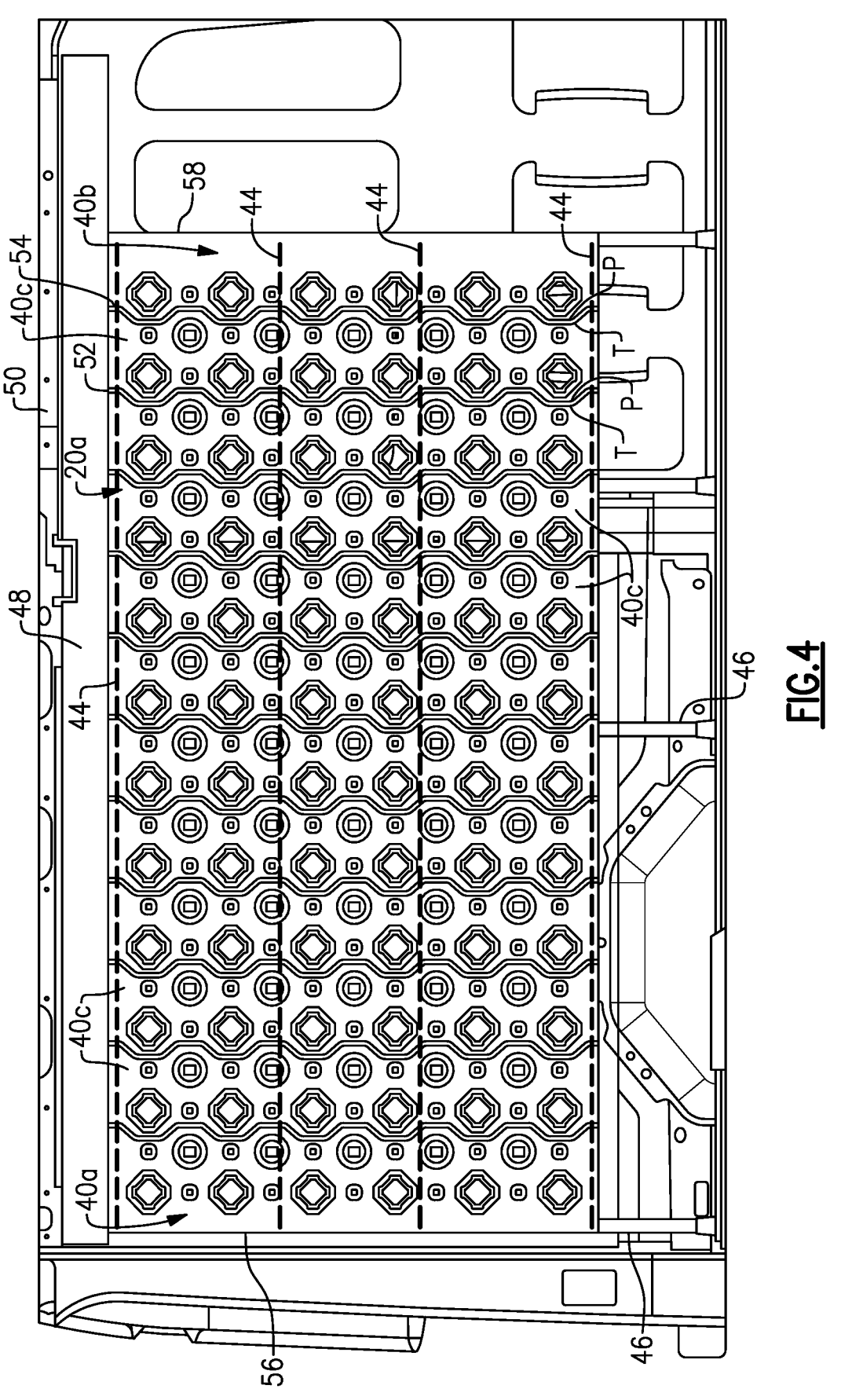
FIG. 4 is a front view of the modular base plate system of FIG. 3.

In one example, the plurality of base plate panels 40 comprise at least a starter panel 40a, an end panel 40b, and at least one center panel 40c having a first side 52 attached to the starter panel 40a and a second side 54, opposite to the first side 52, attached to the end panel 40b. The number of center panels 40c is selected to provide the desired size of the base plate 20. FIG. 3 shows an example where there are thirteen center panels 40c between the starter panel 40a and the end panel 40b. FIG. 4 shows an example where there are ten center panels 40c between the starter panel 40a and the end panel 40b. In one example, the center panels 40c are identical to each other which reduces tooling expenses.

In one example, the starter panel 40a has a first edge 56 comprising a generally straight edge portion along one side of the base plate 20, and the end panel 40b has a first edge 58 comprising a generally straight edge portion along an opposite side of the base plate 20. In one example, the starter panel 40a and end panel 40b comprise caps for the opposing ends of the base plate 20. The starter panel 40a and the end panel 40b have second edges 60 that comprise a contoured profile that corresponds to, or matches with, a contoured profile on the first 52 and second 54 sides of the center panels 40c. The center panels 40c also have first 62 and second 64 opposing ends that comprise generally straight edge portions that, when aligned with each other, extend from the first edge 56 of the starter panel 40a to the first edge 58 of the end panel 40b. In this example, when the panels 40a-40c are assembled together they form an overall rectangular shape defined by straight edges; however, other shapes and sizes of panels could also be used and assembled together to form different shapes and sizes for the overall base plate 20.

In one example, the contoured profiles on the panels 40a-40c comprise a series of recesses/troughs T and protrusions P that alternate with each other. The troughs T on one panel 40 receive the corresponding protrusions P on an adjacent panel 40 as best shown in FIGS. 3-4.

As shown in FIG. 3, the vertical bars 46 of the mounting grid 42 are held at an upper end 66 in top plates 48 and have a lower end 68 that sits on the floor 18. The horizontal rails 44 are held in a floating relationship with the vertical bars 46. In one example, all vertical bars 46 are identical except for a vertical bar 46' that is positioned over a wheel well. In one example, the top plates 48 mount to a vehicle body side inner panel structure 50 as shown in FIG. 4.

In one example, a grounding strap 70 connects the base plate 20 to vehicle sheet metal to provide EMC protection/ reduction and to address any issues related to a short.

In one example, the base plate panels 40 fit together with an exact spacing and are bolted or fastened to the horizontal cross rails 44. As shown in FIG. 4, the base plate 20a is comprised of multiple panels 40 which bolt to the mounting grid 42 to allow a van to be serviced without removal, which is not an issue for the base plate 20b for a truck bed which slides out as shown in FIG. 1C.

Figures 5A, 5B:
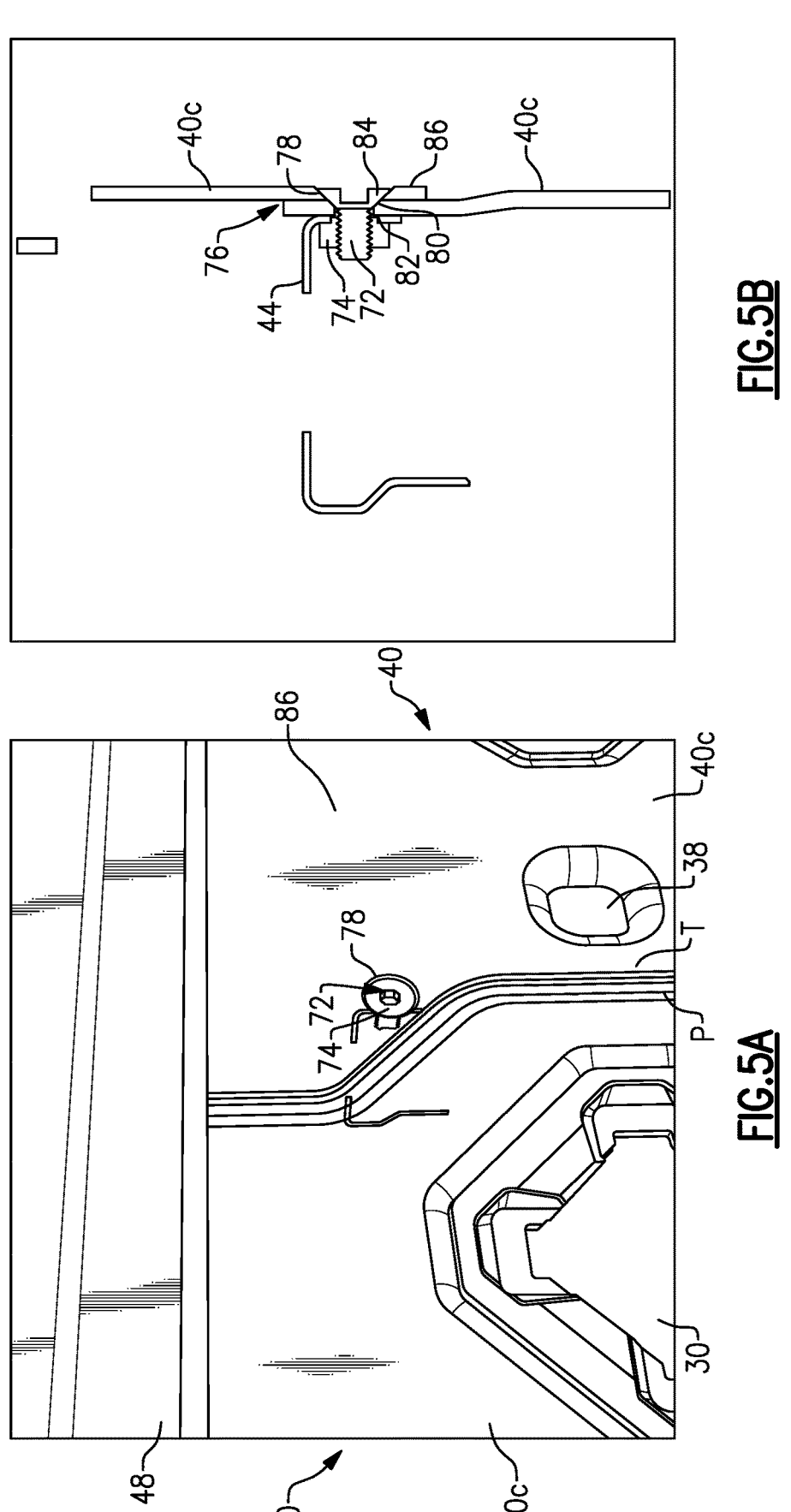
FIG. 5A is a magnified view of a connection interface between two plates of the modular base plate system of FIG. 3.
FIG. 5B is a section view of FIG. 5A.

FIGS. 5A-5B show how two panels 40 are attached to each other at the contoured profile. In one example, one or more fasteners 72 are used to second two panels together at an attachment interface. The attachment interface can be between a starter panel 40a or end panel 40b and a center panel 40c, or the attachment interface can be between two center panels 40c. In the example shown in FIGS. 5A-5B, the fastener 72 comprises a screw that is threaded into a nut 74. When two panels 40 are aligned with each other along the contoured profiles, overlap areas 76 are formed. A first opening 78 in one panel is aligned with a second opening 80 in an overlapping panel and the fastener 72 extends through the openings 78, 80 at the overlap area 76. The horizontal rails 44 include corresponding openings 82 that are aligned with openings 78, 80. The fastener 72 extends through the opening 82 and is threaded into the nut 74 to locate and connect the panels 40 to the horizontal rails 44.

In one example, the nut 74 comprises a press-fit nut that is inserted into the associated opening 82 in the horizontal rail 44. In one example, the top opening 78 is tapered to receive a head 84 of the fastener 72 such that the outer surface of the head 84 is flush with the support surface 86 of the panel 40 or recessed therein.

In one example, the fasteners 72 electrically connect the base plate panels 40 together to provide both EMC shielding for associated inductive chargers as well as addressing any issues related to wiring shorts. An optional embodiment for electrical sizing allows for a user to enter a number of inductive chargers on the plates via a touch screen, and the vehicle will check the overall charging capacity that is available.

Figures 6A, 6B:
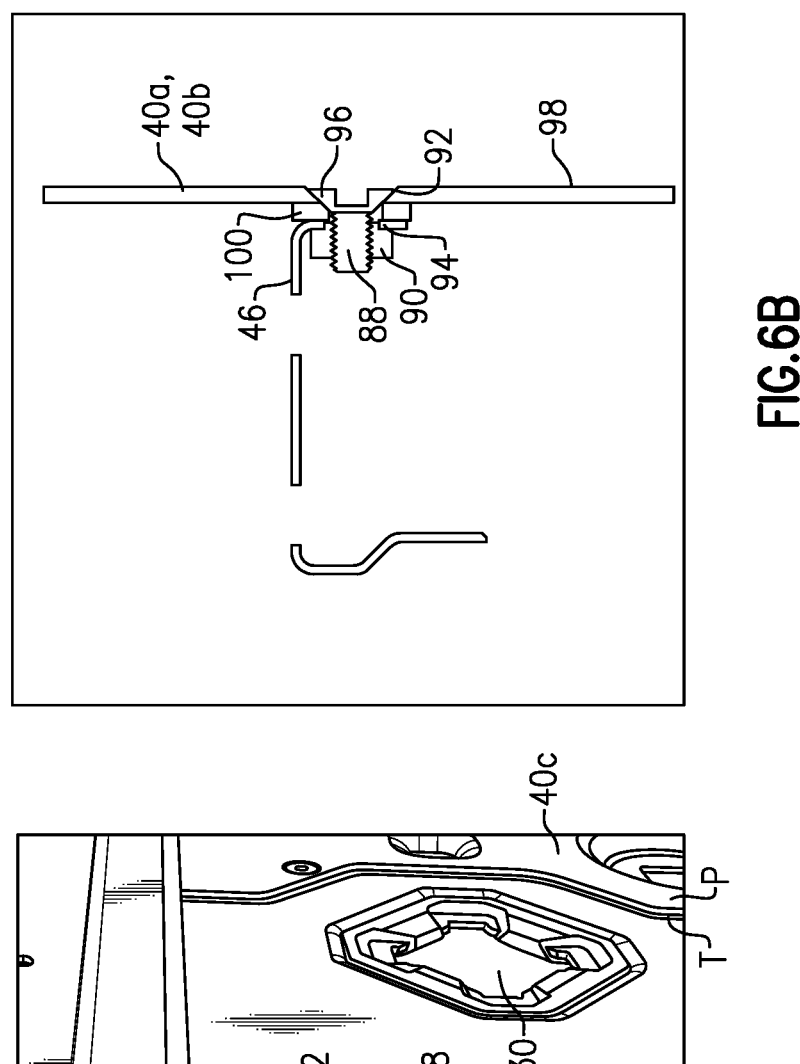
FIG. 6A is a magnified view of a connection interface between an end plate and a vertical bar of the modular base plate system of FIG. 3.
FIG. 6B is a section view of a fastener for an end plate or starter plate.

FIG. 6A shows an example attachment interface between a starter panel 40a or end panel 40b and a vertical bar 46. In the example shown in FIG. 6B, the attachment interface comprises a fastener 88, e.g. a screw, that is threaded into a nut 90. The panel 40a, 40b includes a first opening 92 that is aligned with a second opening 94 in the vertical bar 46 or horizontal rail 44. The fastener 88 extends through the openings 92, 94 and is threaded into the nut 90 to locate and connect the panel 40a, 40b to the vertical bar 46 or horizontal rail 44.

In one example, the nut 74 comprises a press-fit nut that is inserted into the associated opening 94. In one example, the opening 92 in the panel is tapered to receive a head 96 of the fastener 88 such that the outer surface of the head 96 is flush with the support surface 98 of the panel 40a, 40b or recessed therein.

In one example, a washer or a spacer 100 is positioned directly between the vertical bar 46 and the panel 40a, 40b. A washer or a spacer 100 would also be positioned directly between the horizontal rail 44 and the panel 40a, 40b. This provides for better alignment and overall fit for the base plate 20 as this connection interface does not include overlapping plate portions.

In one example, the starter panel 40a and end panel 40b have a flange portion 102 that extends transversely to the support surface 98 of the panel 40a, 40b in a L-shape to cover one end of the vertical bar 46 as shown in FIG. 6A.

Figures 7A, 7B:
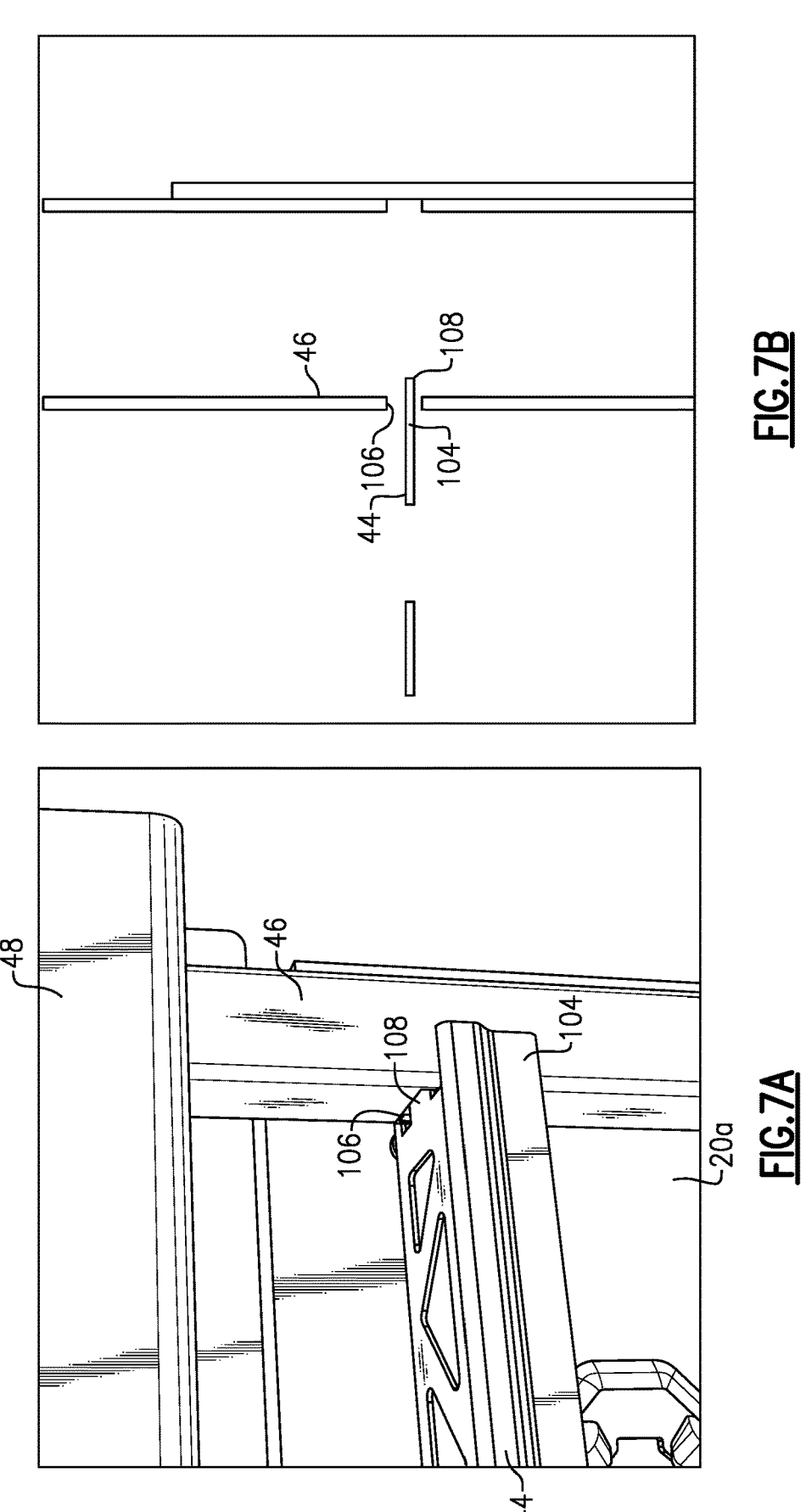
FIG. 7A is a magnified view of a connection interface between a horizontal rail and a vertical bar of the modular base plate system of FIG. 3.
FIG. 7B is a section view of FIG. 7A.

FIGS. 7A-7B show a connection interface between the horizontal rails 44 and the vertical bars 46. The horizontal rails 44 are configured to float in the vertical bars 46. In one example, each opposing end 104 of the horizontal rails 44 fits within an associated slot 106 of the vertical bar 46. In one example, the ends 104 of the horizontal rails 44 comprise recessed areas with a protruding tab 108 that fits within the associated slot 106. This interface comprises a loose fit or floating connection to allow for slight build variations in the vehicle.

Figure 8:
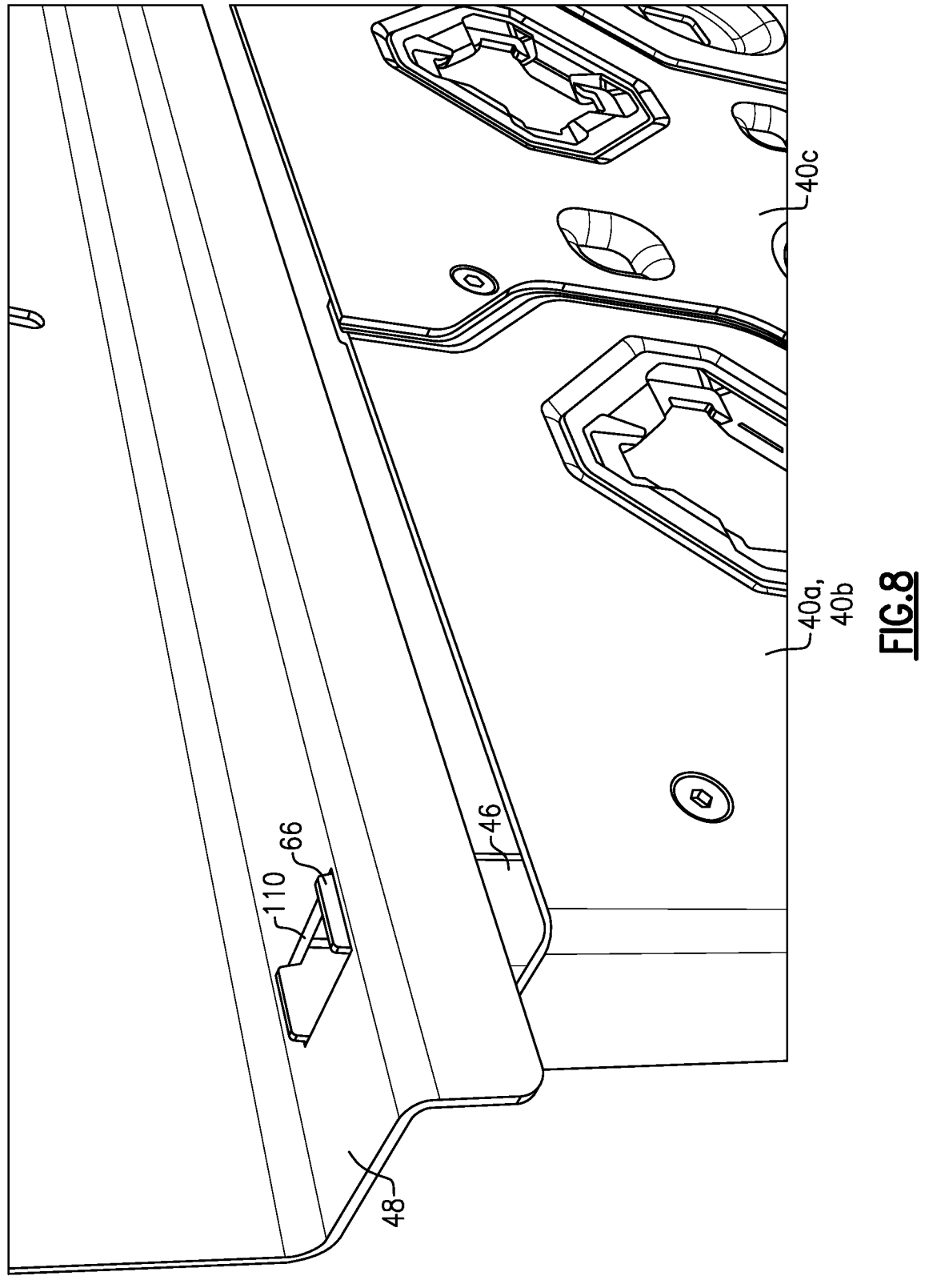
FIG. 8 is a magnified view of a connection interface between a vertical bar and top plate of the modular base plate system of FIG. 3.
Figure 9:
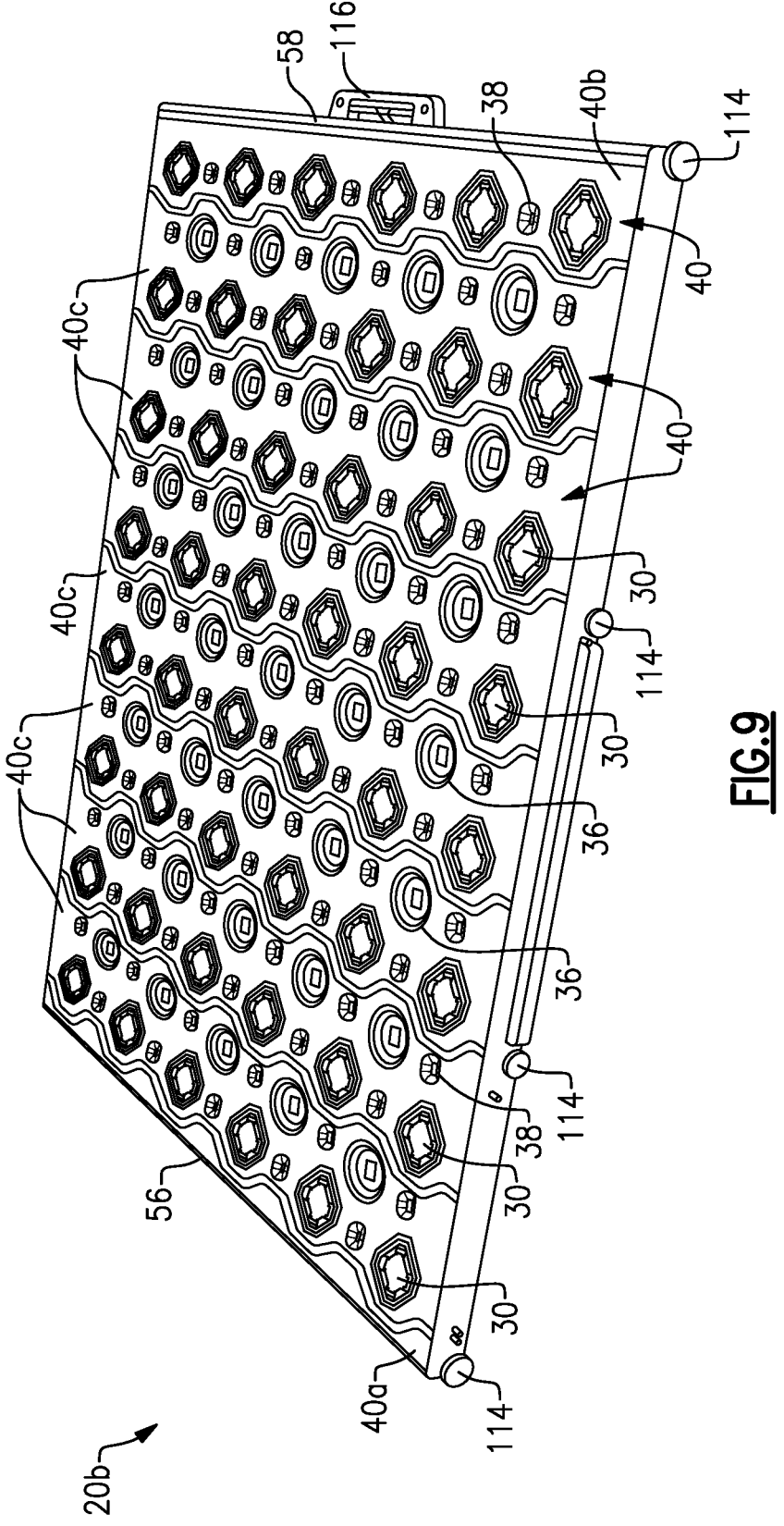
FIG. 9 is a perspective view of one example of a modular base plate system for a floor mount configuration.

FIG. 8 shows a connection interface between the vertical bar 46 and the top plate 48. In one example, the upper end 66 of each vertical bar 46 is inserted into a corresponding slot 110 in the top plate 48. This connection interface is also a loose fit or floating connection to allow for variation adjustment in the vertical direction. In one example, a bottom end 68 of each vertical bar 46 comprises an enlarged foot portion 112 (FIG. 3) to provide stability. The only vertical bar 46' that does not include such a foot is the bar 46' that is located over the wheel well.

FIG. 9 shows an example of the bed or floor mounted base plate configuration. In this example, the panels 40a-40c are spot welded together to provide a base plate 20b having greater strength. The greater strength provides for a robust sliding structure that is easily moved between the extended and retracted positions as discussed above. In one example, a frame (not shown) may be attached to the base plate 20b on a rear side to further increase strength. The starter panel 40a and end panel 40b provide end caps that are a simple bolt-on component which reduces tooling expense. Sliders or rollers 114 are mounted along edges of the base plate 20b to facilitate the sliding motion. In one example, a handle 116 is associated with the end panel 40b to facilitate moving the base plate 20b between the extended and retracted positions. In one example, the handle 116 can be associated with locking pins (not shown) which hold the base plate 20b fixed in place when the base plate 20b is in the retracted position.

The disclosed modular wall and bed base plate systems are configured to allow the base plate to vary in size to reduce tooling expenses and complexity. In a wall mounted configuration, the base plate is mounted to a grid structure comprised of vertical bars and horizontal rails that have a loose fit connection that accommodates build variation in the body structure of the individual vehicle. In the floor mounted configuration, the panels are spot welded together to increase overall plate strength for the sliding mount configuration. In each configuration, the base plate panels are precision fit together so that accessory boxes, which have precise mounting, can be attached to the base plate and inductive power can be transmitted at high efficiency.

The preceding description is exemplary rather than limiting in nature. Variations and modifications to the disclosed examples may become apparent to those skilled in the art that do not necessarily depart from the essence of this disclosure. Thus, the scope of protection given to this disclosure can only be determined by studying the following claims.

What is claimed is:

1. A base plate system, comprising:
   a plurality of base plate panels that are attached to each other to provide a base plate that includes a surface to hold an accessory fixed relative to the base plate, and wherein each base plate panel has a contoured profile that fits with a contoured profile of an immediately adjacent base plate panel, and wherein each contoured profile for each base plate panel is comprised of a plurality of troughs that alternate with a plurality of protrusions along at least one edge of each base plate panel; and an attachment feature associated with each contoured profile such that adjacent base plate panels can be attached to each other to provide a desired base plate size.

2. The base plate system of claim 1, wherein at least some of the plurality of base plate panels include a plurality of mounting foot apertures configured to receive a mounting foot associated with the accessory.

3. The base plate system of claim 1, wherein the attachment feature comprises a plurality of spot welds.

4. The base plate system of claim 1, wherein the attachment feature comprises a plurality of fasteners.

5. The base plate system of claim 1, wherein the plurality of base plate panels comprise at least a starter panel, an end panel, and at least one center panel having a first side attached to the starter panel and a second side, opposite to the first side, attached to the end panel.

6. The base plate system of claim 5, wherein the at least one center panel comprises a plurality of center panels.

7. The base plate system of claim 6, wherein both of the starter panel and end panel have a first side forming a generally straight edge portion of the base plate, and wherein the first sides of the plurality of center panels comprise a first contoured profile and the second sides of the plurality of center panels comprise a second contoured profile that fits with the first contoured profile to attach the center panels to each other.

8. The base plate system of claim 5, including a plurality of vertical bars and a plurality of horizontal rails that form a support structure, wherein the base plate is mounted to the support structure.

9. A base plate system, comprising:
a plurality of base plate panels that are attached to each other to provide a base plate that includes a surface to hold an accessory fixed relative to the base plate, wherein the plurality of base plate panels comprise at least a starter panel, an end panel, and at least one center panel having a first side attached to the starter panel and a second side, opposite to the first side, attached to the end panel;
an attachment feature associated with each base plate panel such that adjacent base plate panels can be attached to each other to provide a desired base plate;
a plurality of vertical bars and a plurality of horizontal rails that form a support structure, wherein the base plate is mounted to the support structure; and
wherein the attachment feature comprises at least one fastener, and wherein one of the center panel, end panel, and starter panel overlaps another of the center panel, end panel, and starter panel to form an overlap area, and wherein the at least one fastener extends through the overlap area to connect the base plate to one of the plurality of horizontal rails.

10. The base plate system of claim 9, including a spacer for each fastener used to attach the end panel and starter panel to one of the plurality of horizontal rails or plurality of vertical bars.

11. A base plate system, comprising:
a plurality of base plate panels that are attached to each other to provide a base plate that includes a surface to hold an accessory fixed relative to the base plate, wherein the plurality of base plate panels comprise at least a starter panel, an end panel, and at least one center panel having a first side attached to the starter panel and a second side, opposite to the first side, attached to the end panel;

an attachment feature associated with each base plate panel such that adjacent base plate panels can be attached to each other to provide a desired base plate;
a plurality of vertical bars and a plurality of horizontal rails that form a support structure, wherein the base plate is mounted to the support structure; and
wherein ends of the horizontal rails float within slots formed in the vertical bars.

12. The base plate system of claim 11, wherein the vertical bars include a support foot at one end and wherein an opposite end of the vertical bars are received within a slot formed in a top plate that is configured to be mounted to a vehicle side wall structure.

13. The base plate system of claim 5, wherein the base plate is mounted within a vehicle cargo area to provide a floor mounted base plate that is movable relative to a fixed structure between a retracted position and an extended position.

14. A base plate system, comprising:
a plurality of base plate panels comprising at least a starter panel, an end panel, and at least one center panel having a first side attached to the starter panel and a second side, opposite to the first side, attached to the end panel to form a base plate, and wherein the first side of the at least one center panel comprises a first contoured profile and the second side of the at least one center panels comprises a second contoured profile, and wherein the first contoured profile overlaps a mating contoured profile along the starter panel at an overlap area, and wherein the second contoured profile overlaps a mating contoured profile along the end panel at an overlap area;
the first contoured profile, the second contoured profile, and each mating contoured profile each comprise a plurality of troughs that alternate with a plurality of protrusions;
a plurality of mounting foot apertures formed in the base plate that are configured to receive an accessory mounting foot to hold an accessory fixed relative to the base plate; and
an attachment feature provided at each of the overlap areas such that adjacent base plate panels can be attached to each other to provide a desired base plate size.

15. A base plate system, comprising:
a plurality of base plate panels comprising at least a starter panel, an end panel, and at least one center panel having a first side attached to the starter panel and a second side, opposite to the first side, attached to the end panel to form a base plate;
a plurality of mounting foot apertures formed in the base plate that are configured to receive an accessory mounting foot to hold an accessory fixed relative to the base plate;
an attachment feature associated with each base plate panel of the plurality of base plate panels such that adjacent base plate panels can be attached to each other to provide a desired base plate size; and
a plurality of vertical bars and a plurality of horizontal rails, wherein the vertical bars include a support foot at one end and wherein an opposite end of the vertical bars are received within a slot formed in a top plate that is configured to be mounted to a vehicle side wall structure, and wherein ends of the horizontal rails float within slots formed in the vertical bars to form a support structure, and wherein the base plate is mounted to the support structure.

16. The base plate system of claim 14, wherein the base plate is mounted within a vehicle cargo area to provide a floor mounted base plate that is movable relative to a fixed structure between a retracted position and an extended position.

17. A method comprising the steps of:

providing a plurality of base plate panels that each include a surface with a plurality of mounting foot apertures configured to receive a mounting foot from an accessory, and wherein each base plate panel has a contoured profile along at least one edge;

forming each contoured profile for each base plate panel as a plurality of troughs that alternate with a plurality of protrusions along the at least one edge;

fitting the contoured profile of one base plate panel with the contoured profile of an immediately adjacent base plate panel to provide an overlap area; and attaching a selected number of base plate panels to each other at the overlap area to provide a base plate having a desired base plate size.

18. The method of claim 17, wherein the plurality of base plate panels comprise at least a starter panel, an end panel, and at least one center panel, and including attaching a first side of the center panel to the starter panel and attaching a second side of the center panel, opposite to the first side, to the end panel to form the base plate.

19. The method of claim 18, including coupling a plurality of vertical bars to a plurality of horizontal rails to form a support structure, and attaching the base plate to the support structure to form a wall mounted base plate system.

20. The method of claim 18, including spot welding the starter panel, the end panel, and the at least one center panel together to form the base plate and installing the base plate within a vehicle cargo area to form a floor mounted base plate.

21. The base plate system of claim 1, wherein contoured profiles of adjacent base plate panels overlap each other along edges of the adjacent base plate panels to form an overlap area, and wherein the attachment feature as at the overlap area.

\* \* \* \* \*